United States Patent [19]

Bille

[11] 4,358,777

[45] Nov. 9, 1982

[54] DEVICE FOR RECORDING AND HANDLING OF INFORMATION REGARDING TIME AND ACTIVITIES

[75] Inventor: Dag Bille, Kungsbacka, Sweden

[73] Assignee: Svensk Ideutveckling AB Dag Bille, Kungsbacka, Sweden

[21] Appl. No.: 221,002

[22] Filed: Dec. 29, 1980

[30] Foreign Application Priority Data

Jan. 25, 1980 [SE] Sweden .............................. 8000590

[51] Int. Cl.[3] ........................ G01D 9/32; G01D 15/04

[52] U.S. Cl. ........................................ 346/82; 346/1.1

[58] Field of Search ...................... 346/1.1, 80, 82, 93, 346/94

[56] References Cited

U.S. PATENT DOCUMENTS

| | | | |
|---|---|---|---|
| 3,390,395 | 6/1968 | Gamburd et al. | 346/1.1 |
| 3,740,727 | 6/1973 | Griffin | 346/82 X |
| 3,889,103 | 6/1975 | Russell et al. | 346/94 X |
| 4,270,043 | 5/1981 | Baxter et al. | 346/82 X |

*Primary Examiner*—Donald A. Griffin

*Attorney, Agent, or Firm*—Holman & Stern

[57] ABSTRACT

A device for recording, handling and documentation of time/activity data. The duration of different categories of work occasions and/or activities, as for example down time, can be measured by activation of a press button corresponding to each category of work. A pulse train (11), generated in a pulse generator (10), is provided to at least one of a plurality of storage cells (12). As the time between two pulses (11*a*), following after each other, is constant and known, e.g. one hundredth of an hour, the total number of pulses (11*a*) the storage cells (12) are fed with, will correspond to a time value required for the respective output of work and/or activity. When desired the information content of all storage cells (12) is read. This information is converted and/or handled and the result is printed (7) in a manually readable form on an information carrier (6). The information content of the storage cells (12) can also be transferred to and handled by a central reading unit.

1 Claim, 11 Drawing Figures

FIG. 10

| | | | |
|---|---|---|---|
| TODAY'S | | | |
| DATE | 80 01 10 | | |
| TIME | 14:52 | | |
| MACHINE | 06 | | |
| O-TIME | 0.91 | 3 | 57% |
| SET-UP | 0.12 | 6 | 7% |
| PRINTING | 0.02 | 4 | 1% |
| STENCIL | 0.05 | 94 | 3% |
| STENC MR | 0.01 | 1 | 1% |
| STENC BR | 2.18 | 2 | 35% |
| INK | 99.99 | 3 | 42% |
| PAPER | 0.07 | 12 | 4% |
| APPROVAL | 0.02 | 0 | 1% |
| AD.PRINT | 0.01 | 1 | 1% |
| REPRINT | 0.02 | 1 | 1% |
| UNRACK | 0.02 | 2 | 1% |
| NO JOBS | 99.99 | 1 | 11% |
| REST | 0.02 | 1 | 1% |
| REPAIR | 0.09 | 10 | 6% |
| VACANT | 0.04 | 0 | 2% |
| ORDER | 0.02 | 1 | 1% |
| TODAY'S | 0.01 | 3 | 1% |
| DATE | 0.03 | 2 | 2% |
| MACHINE | 1.52 | 1 | 94% |
| SUM | 1.61 | | |

| | | | |
|---|---|---|---|
| ORDER | 111110110111 | | |
| DATE | 80 01 10 | | |
| TIME | 14:52 | | |
| MACHINE | 06 | | |
| O-TIME | 0.11 | 1 | 16% |
| SET-UP | 0.08 | 3 | 12% |
| PRINTING | 0.02 | 3 | 3% |
| STENCIL | 0.02 | 1 | 3% |
| STENC MR | 0.01 | 1 | 1% |
| STENC BR | 0.09 | 2 | 13% |
| INK | 0.01 | 3 | 1% |
| PAPER | 0.03 | 2 | 4% |
| APPROVAL | 0.02 | 1 | 3% |
| AD.PRINT | 0.01 | 1 | 1% |
| REPRINT | 0.02 | 1 | 3% |
| UNRACK | 0.01 | 1 | 1% |
| NO JOBS | 0.03 | 1 | 4% |
| REST | 0.02 | 1 | 3% |
| REPAIR | 0.09 | 1 | 13% |
| VACANT | 0.04 | 1 | 6% |
| ORDER | 0.02 | 1 | 3% |
| TODAY'S | 0.01 | 1 | 1% |
| DATE | 0.02 | 1 | 3% |
| MACHINE | 0.02 | 1 | 3% |
| SUM | 0.65 | | |

DEVICE FOR RECORDING AND HANDLING OF INFORMATION REGARDING TIME AND ACTIVITIES

BACKGROUND OF THE INVENTION

The present invention relates to a device for recording and handling of information regarding time and activities, and more exactly defined, a recording of the duration of various categories of work sequenses or down time, which can be related to one and the same project. By way of an example a project can be the manufacture of a complicated product, the manufacture of a series of products, or the performance of services like constructions work etc. Every recorded period of time is through manual activation of an input device assigned to a certain work sequence or incident.

For the purpose of increasing the capacity of the production resources of a company, i.e better planning and usage, it is necessary to carry on time studies. In the running operations of a company it is also important that every new order is offered at a relevant and competetive price, and therefore detailed calculating data is of considerable assistance. In connection herewith also rate fixing, production organization and the like is of a great importance for the final charge. It is therefore important that the time needed for performance of a certain work sequence or the time needed for various kinds of machine standstills, can be easily measured and recorded. Moreover, the matter is complicated by such facts that e.g. a number of categories of work sequences is performed during a short period of time, and that the same category of work outputs return at regular intervals. To be able to solve these problems satisfactorily, it is necessary that the time needed for each work operation within the project is related to a category code specific for each work sequence. This is important when the order is to be invoiced, for consideration has to be taken to the one who has performed the work, the kind of work operation and whether the work has been performed within normal working hours or on overtime etc.

The work sequences or incidents are thus related to different categories. By way of example there are such categories as type of work, that is performed, like drawing, calculation, consulting, printing etc. As regards categories of standstill there are such as tool breakage, change of shift, break, change of order or waiting for new orders. In order to be able to use all the collected data, it is necessary that the data is handled and put together in a clearly arranged composition (table, schedule). If not, there is a great risk that the work with the offers will be more difficult instead of easier, due to the flow of information. This will probably lead to increased staff costs and consequently charge the production with unprofitable extra costs.

The devices for recording of time and activities, which are known today, often have a mechanical construction with details, which give rise to a low reliability and to a heavy and ungainly device. These devices are also disadvantageous as their calculating and handling capacity is low. A great deal of manual work is thus necessary in order to analyze the collected data.

SUMMARY OF THE INVENTION

The purpose of the invention is, with the least possible effort, to record the duration of different categories of work or similar activities and incidents. A device for this purpose should be inexpensive to produce in series, flexible and easy to adapt to the current working situation, and possess a large handling and calculating capacity.

It should also be possible to include the time/activity recorder unit in a larger information system, which also may include a central computer for total handling of data, fed via the time/activity recorder unit. This is achieved by a pulse train, generated in a pulse generator and consisting of pulses with a fixed, constant frequency, which is provided and accumulated in at least one of a plurality of possible and manually selected storage cells, and information, e.g. in the form of project numbers, machine numbers, running numbers, dates and the like, which is selectively and manually supplied to the device via input devices, such as thumb wheel switches or electronic switches, and storage cells and the input devices at documentation are consecutively scanned, their stored information is handled, e.g transformed to units of time, after which the results are presented in manually readable form via an information carrier, e.e printed out on paper.

BRIEF DESCRIPTION OF THE DRAWINGS

The invention will be further described with reference to an embodiment illustrated in the attached drawings, wherein, FIGS. 8–10 show examples of edited for printings.

DETAILED DESCRIPTION OF AN EMBODIMENT

Figure 1:
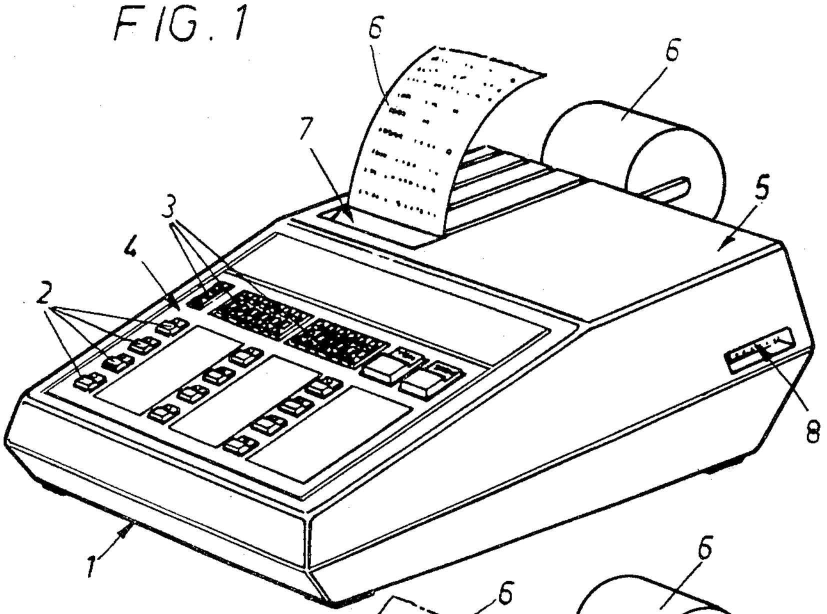
FIG. 1 is a perspective view of a time/activity recorder unit in accordance with the invention.
Figure 2:
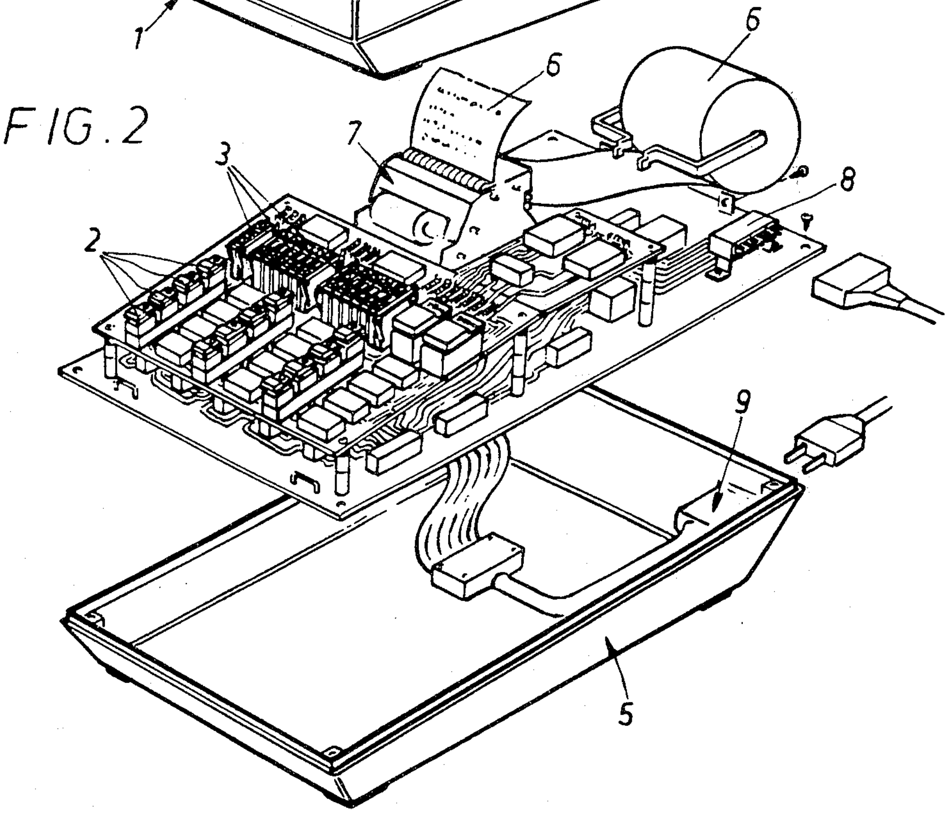
FIG. 2 shows the time/activity recorder unit of FIG. 1 with the casing removed.

A time/activity recorder unit 1 according to the invention is illustrated in FIG. 1. A plurality of input units in the form of switches 2 and thumb wheel switches or electronic switches 3, are arranged on a keyboard 4. The keyboard 4 is easily accessible and is part of the casing 5 of the time/activity recorder unit 1. An information carrier, e.g in the form of a heat-sensitive piece of paper or paper covered with a thin metal layer 6, is arranged at the end of the time/activity recorder unit 1. The paper 6 runs through an opening (not shown) in the casing 5 into the time/activity recorder unit 1, thus passing a printer 7. This makes it possible for th printer 7 to print alphanumeric data on the paper 6. At the left side of the casing 5 there is located a multi-polar contact box 8, which when necessary can be connected with a central computer or to a central automatic reading device located (not shown). The time/activity recorder unit 1 is at its rear end provided with a main plug 9, through which it can be connected to network.

Figure 3:
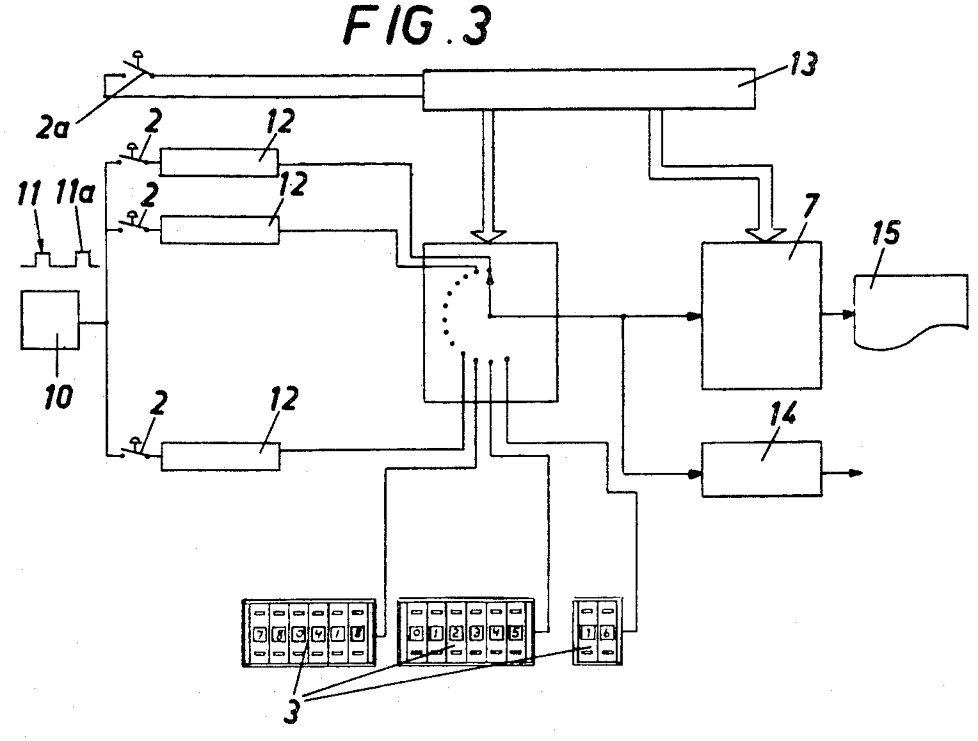
FIG. 3 is a schematic block diagram of the functioning of the time/activity recorder unit in accordance with the invention.
Figure 4:
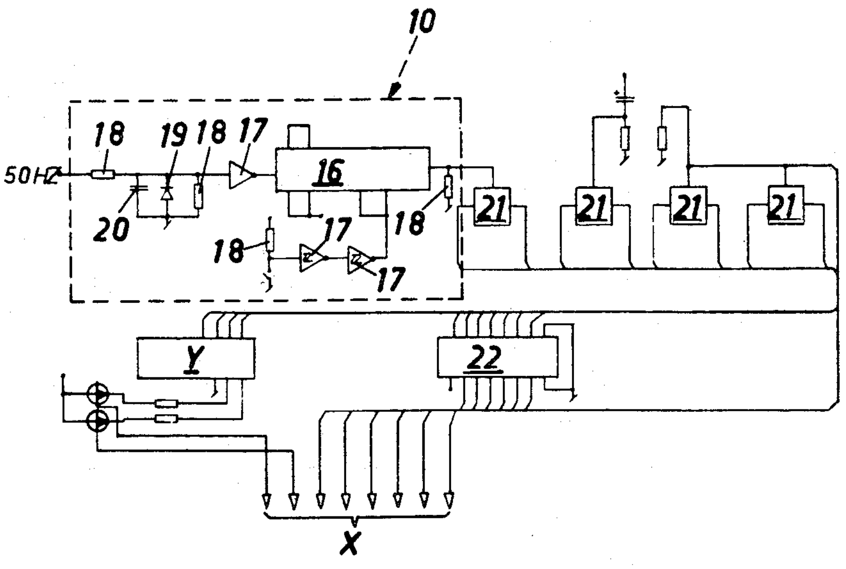
FIGS. 4–7 are a schematic views showing circuitry of an embodiment of the invention.
Figure 5:
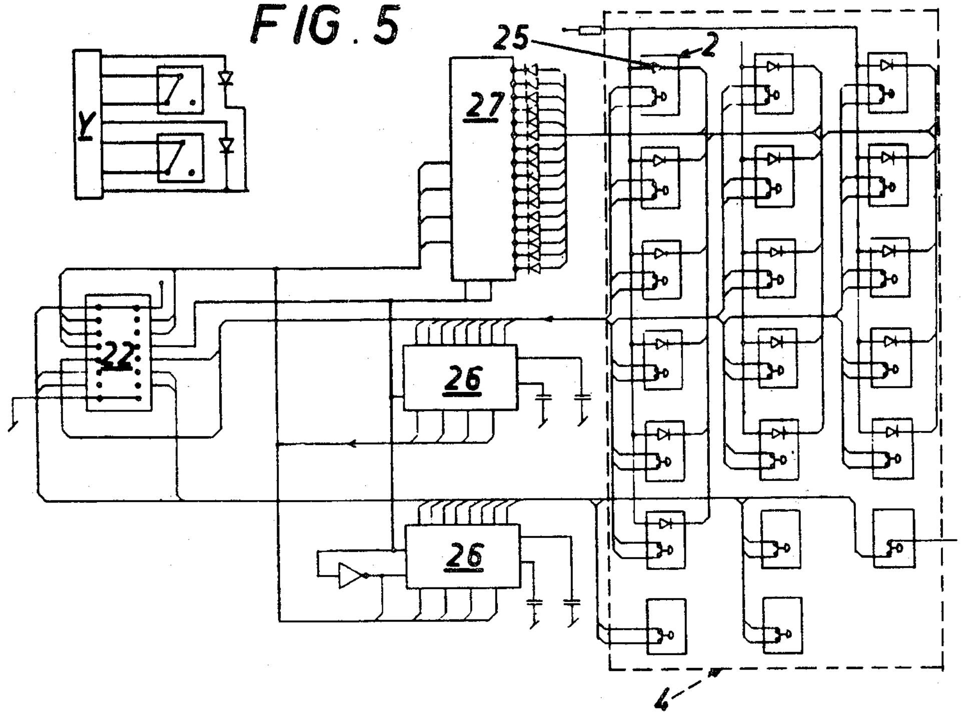
Figure 6:
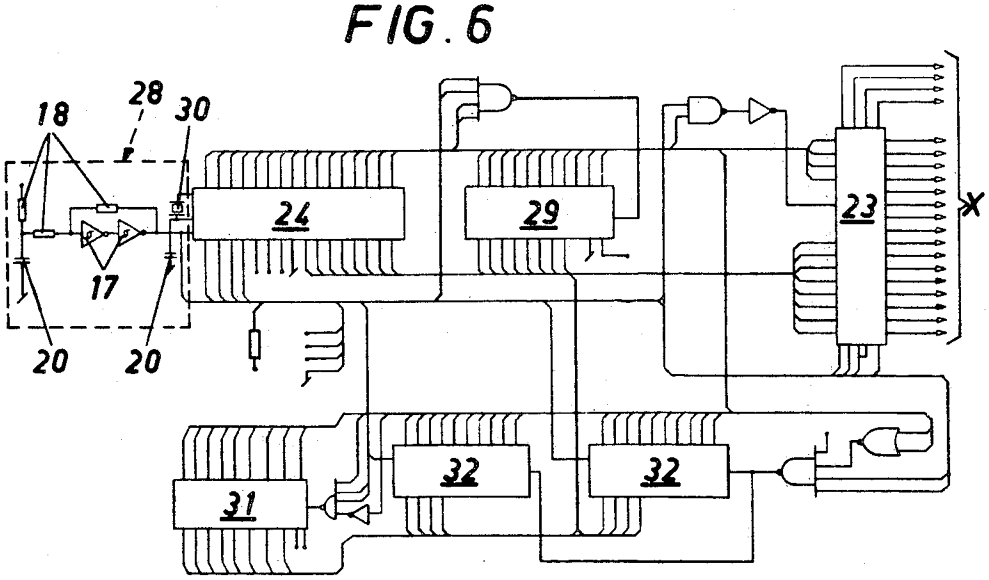
Figure 7:
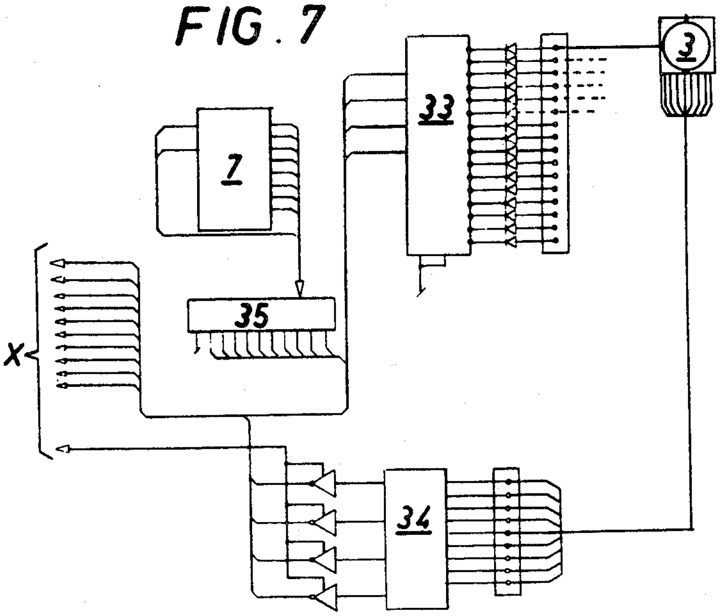

FIG. 3 is a schematic block diagram of the construction of the time/activity recorder unit 1. A pulse generator 10 emits a continuous pulse train 11, the pulses of which are square-shaped. The frequency of the pulse train 11 and the width of the pulses 11*a* are constant and adjusted so that the time between the front flanks of two consecutive pulses 11*a* correspond to e.g one hundredth part of an hour. A plurality of switches 2 are arranged to control the pulse train 11 from the pulse generator 10 to at least one of several possible storage cells 12. The switches, arranged on the keyboard 4, can be manually activated, preferably one at a time. Particular, fixed data can be fed into the time/activity recorder unit 1 through thumb wheel switches 3. This data may be today's date, project number, machine number or the like. A central unit 13 is provided in order to control the information flow of the time/activity recorder unit, dependent upon which of the switches 2 are manually activated. Activation of a switch 2*a* starts a consecutive reading of the information from the storage cells 12 as well as from the thumb wheel switches 3. This information is handled and calculated by means of a microprocessor program. The result is lead to the printer 7, at which a transcript 15 is obtained. Furthermore, a modem 14 is provided in order to allow the information of the storage cells 12 and the electronic switches 3 to be read and transferred to a central computer (not shown) which is located outside the time/activity recorder unit 1.

FIG. 4–7 show schematically electronic circuitry of the present invention. The components mainly consist of integrated circuits (IC) made in CMOS-technique. This involves essential advantages, such as low power consumption and a good level of reliability. A main stabilizer (not shown) supplies the IC-circuits with three different voltages +5 volts, −12 volts and −24 volts. For the pulse generator 10 is used a pulse shaper 16 (Motorola 4518), which transforms the signal of the network, with an amplitude of 10 volts and a frequency of 50 Hz, to a pulse train 11, in which the pulses, 11*a* are essentially square-shaped. The time between the front flanks of two pulses 11*a*, following each other, is equivalent to one hundredth of an hour. The pulse shaper 16 also consists of three inverted Schmitt-triggers 17, four resistors 18, a diode 19 and a capacitor 20.

The pulse train 11 passes through an analogue switch 21 via a flat cable switch 22, i.e. to an interface circuit 23 (PIA 6820). The interface circuit 23 has to adapt signals from external circuit elements to signals useful for a conventional micro-processor unit 24 (6802). The switches 2, located on the key-board 4, are also provided with light diode indicators 25 and connected to two keyboard encoders 26 (Texas 74923) and to a binary code circuit 27 (Texas 74C154). The two keyboard encoders 26 transform decimal signals from the key-board 4 to binary code. These signals, which are transformed to binary code, are fed to the micro processor unit 24 via the interface circuit 23. A clock signal generator 28 as well as a primary store circuit 29 (2716) are connected to the micro processor unit 24.

This primary store circuit 29 is like the rest of the IC-circuits of DIP-type (Dual-In-Line Package), which results in the fact that the IC-circuits easily can be removed and exchanged. This facilitates repairing and provides the basis of the flexibility of the time/activity recorder unit 1, as store circuits with permanently stored information which can easily be "plugged in". The primary store circuit 29 contains the program steps, with which the micro processor unit operates.

The clock signal generator 28, connected to the micro processor unit 24, consists of two inverted Schmitt-Triggers 17, three resistors 18, two capacitors 20 and a crystal 30. The clock signal generator 28 oscillates with a frequency of about 4 MHz and determines the speed, with which the micro processor unit 24 operates. The Schmitt-triggers 17 with surrounding resistors and capacitors also give the micro processor unit a start flank when the voltage is switched on. To the micro processor unit is furthermore connected a constant store circuit 31 (6334), in which for example headings and other constants, needed to obtain a readable transcription, are stored . Also the permanent constant store circuit 31 is very easily changed which is essential for the adaptability of the time/activity recorder unit 1. This makes it easy to exchange headings, e.g. to change Swedish headings to other languages.

For the purpose of recording, storing and adding different times for different work operations, the micro processor unit 24 is also connected with two store circuits 32 (2114). In these store circuits 32 there are arranged i.a sixteen stoage cells 12, to which pulses 11*a* can be supplied, added and stored. By manual influence of the switch 2, located on the key-board 4, it is possible to provide one or more of these storage cells 12 with pulses 11*a* from the pulse generator 10 by the micro processor unit 24 by means of the programs stored in the primary store 29. By manual influence on one of the switches 2, the micro processor unit 24 can be made to consecutively scan the data of each storage cell 12 and transform this to the printer 7, or the micro processor unit 24 can be made to erase all the storage cells 12, at which their data is cancelled. At the same time as the information is printed out by the printer 7 the earlier input data is handled, calculated and edited. The result can be the total time for all work needed for one and the same project, and information about how long a time every work operation has taken expressed in percent. Thus the result, after being handled in the micro processor unit 24, will be transmitted to the printer 7 via the interface-circuit 23 and the flat cable plug 35.

At the printing the above mentioned storage cells 12 are scanned as well as the thumb wheel switches 3, provided to the time/activity recorder unit. This is done by means of a binary code circuit 33 (Texas 74C154), whose inputs receive information in binary form about which electronic switch 3 is to be read next. This information is transformed to decimal form, i.e. only one of the 16 outputs is activated. An electronic switch 3 is connected to each of the outputs of the binary code circuit 33. The electronic switch 3, which is intended to be read, will thereby receive voltage. The electronic switches 3 have their outputs connected with a decimal to binary coders 34 (Texas 74LS147), which revert the signals from the electronic switches 3 to binary form, which is supplied to the micro processor unit 24 via the interface circuit 23.

Figure 8:
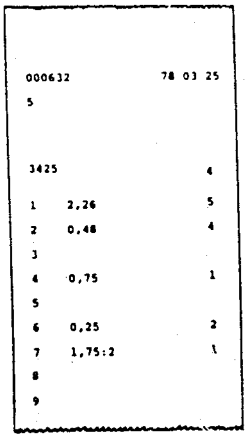
Figure 9:
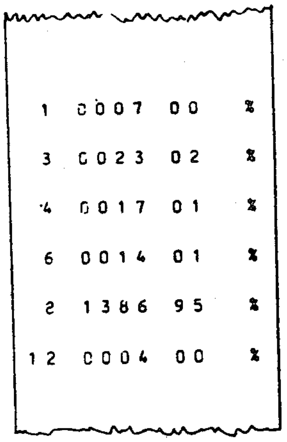

Examples of possible, edited, outputs are illustrated in FIGS. 8, 9 and 10. On a, e.g heat-sensitive paper in accordance with FIG. 8, there will be documented a project number at the top, today's date on the right hand side and below the machine number or the number of the operator. On the third line from the top the number of manufactured products of the current project is stated and the number of occasions, during which the production has taken place. On the fourth line and below, at the extreme left, the category of working operation or activity is stated, and to the right the time needed for each category, and at the extreme right the number of occasions needed.

FIG. 9 shows a similar output, at which the category code of the working operation is printed at the extreme left, the periods of time, in e.g hundredth of hours, needed for each working operation in the middle, and the time expressed in percentage of the total time at the extreme right.

FIG. 10 shows a similar way of printing, at which order number, date, time and machine number are stated on top. The rest of the printing mainly consists of a list of various categories of work occasions and information about the time needed for each one of these. At the extreme right the time needed is expressed in percentage of the total time consumption.

Figure 11:
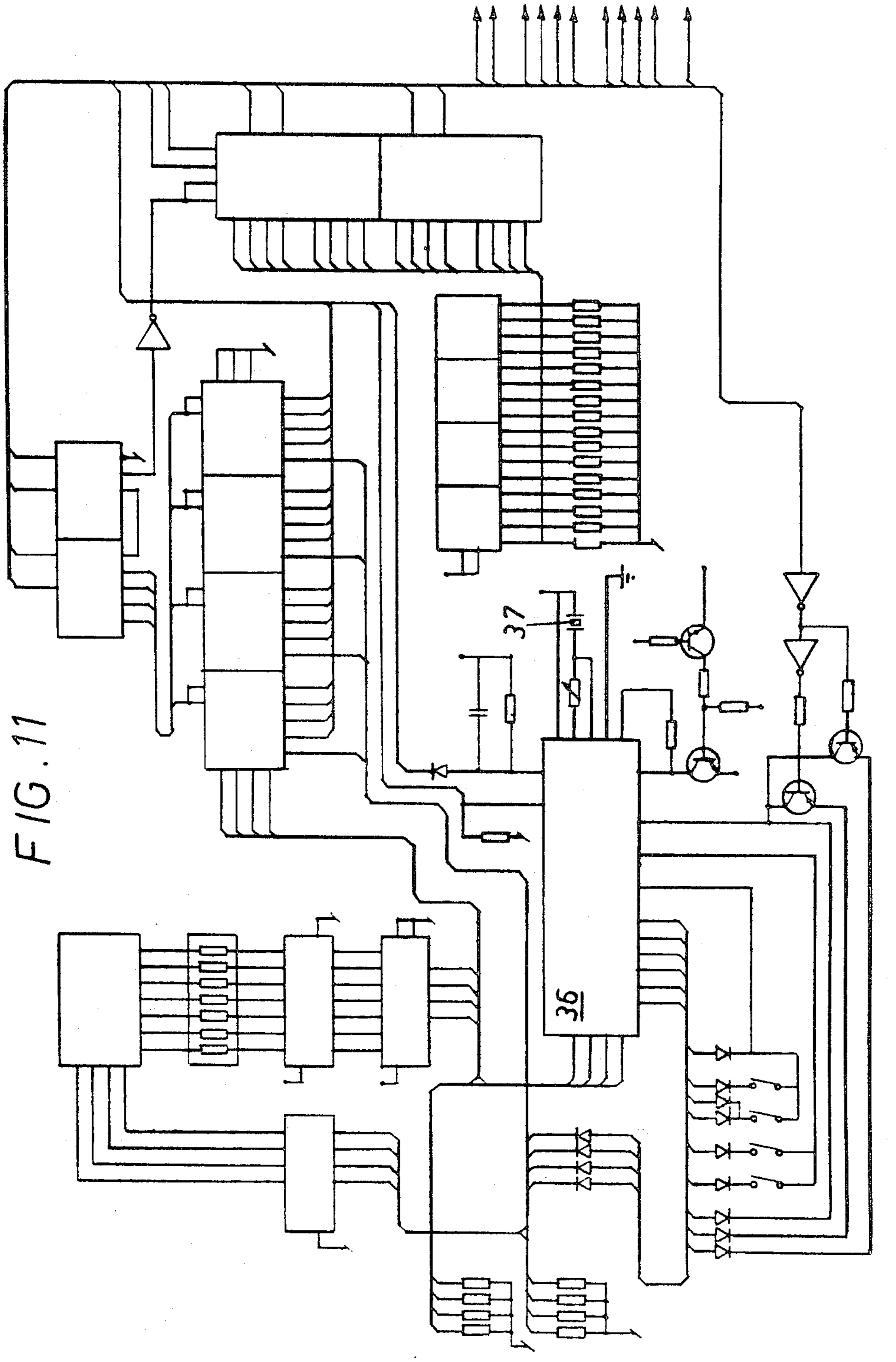
FIG. 11 is a schematic of a circuit for another embodiment of the invention.

FIG. 11 illustrates an alternative connection of pulse generator. A clock circuit 36 is arranged to transform the network voltage frequency to a pulse frequency with a suitable interval, e.g 1 Hz. In case the network voltage drops off, the clock circuit 36 together with crystal 37, generates an internal signal, which thus replaces the network voltage frequency . Then also the storage cells for date and time, which are arranged in the clock circuit, are updated the whole time so that this data need not be fed by the operator.

The invention is of course not restricted to the above described embodiment but could also be used for a number of alternative embodiments within the scope of the invention.

I claim:

1. A time and activity recorder for recording, handling and documentation of the duration of various categories of work sequences and the like, such as down times, change of tools, brakes, production and the like, comprising
   a pulse generator adapted to generate a pulse train with predetermined and constant frequency, manually operated input devices adapted to generate signals and provide these to a central processing unit adapted to guide the pulse train to at least one of a plurality of storage cells provided in the time and activity recorder where the pulses are accumulated and/or stored, at least one further manually operated input device operably connected to said central processing unit to activate said central processing unit to scan the storage cells and/or the input devices and read their information or position and thereafter compute results and feed them to a printer adapted to print the results on an information carrier, for example by printing out characters on paper.

* * * * *